United States Patent
Kozyreff

[19]

[11] Patent Number: 5,967,548
[45] Date of Patent: Oct. 19, 1999

[54] SAFETY ARRANGEMENT

[75] Inventor: Michel Kozyreff, Bonsecours, France

[73] Assignee: Autoliv Development AB, Vargarda, Sweden

[21] Appl. No.: 08/809,787

[22] PCT Filed: Sep. 25, 1995

[86] PCT No.: PCT/SE95/01088

§ 371 Date: Apr. 10, 1997

§ 102(e) Date: Apr. 10, 1997

[87] PCT Pub. No.: WO96/09942

PCT Pub. Date: Apr. 4, 1996

[30] Foreign Application Priority Data

Sep. 29, 1994 [GB] United Kingdom .................. 9419638

[51] Int. Cl.⁶ .................................................. B60R 21/32
[52] U.S. Cl. ............................ 280/735; 180/282; 701/45
[58] Field of Search .................................. 280/735, 734;
180/274, 282; 701/45, 46; 340/436; 307/10.1

[56] References Cited

U.S. PATENT DOCUMENTS

| | | | |
|---|---|---|---|
| 3,741,584 | 6/1973 | Arai | 280/735 |
| 3,851,305 | 11/1974 | Baba et al. | 280/735 X |
| 5,322,323 | 6/1994 | Ohno et al. | 280/735 X |
| 5,326,133 | 7/1994 | Breed et al. | 280/735 |
| 5,390,951 | 2/1995 | Iyoda | 280/735 X |
| 5,428,534 | 6/1995 | Wetzel et al. | 280/735 |
| 5,439,249 | 8/1995 | Steffens, Jr. et al. | 280/735 |
| 5,573,269 | 11/1996 | Gentry et al. | 280/735 |

FOREIGN PATENT DOCUMENTS

| | | |
|---|---|---|
| 2270183 | 3/1994 | United Kingdom . |
| 91/13784 | 9/1991 | WIPO . |

*Primary Examiner*—Christopher P. Ellis
*Attorney, Agent, or Firm*—Venable; George H. Spencer; Catherine M. Voorhees

[57] ABSTRACT

A safety arrangement in a motor vehicle includes a processor (1) which is associated with a central accelerometer (2) to provide an input signal indicative of the acceleration being experienced by the central part of the vehicle and also with at least one front sensor (3) adapted to provide an input signal to the processor in response to an impact at the front of the vehicle. The front sensor (3) is able to distinguish between differing degrees of severity of impact. The processor (1) controls at least one safety device such as an air-bag (6). The safety device has different modes of performance. The processor is adapted to activate the safety device in response to a predetermined signal generated by the central accelerometer (2) and is also adapted to select or control the mode of performance of the safety device in dependence upon the signal from the front sensor (3).

19 Claims, 2 Drawing Sheets

SAFETY ARRANGEMENT

BACKGROUND OF THE INVENTION

THE PRESENT INVENTION relates to a safety arrangement, and more particularly relates to a safety arrangement in a motor vehicle.

It has been proposed to provide a motor vehicle with an accelerometer adapted to provide a signal indicative of the acceleration being experienced by a central part of the vehicle, that signal, or its integrated valve, being used to control the activation of a safety device, such as an air-bag. A problem with an arrangement of this type is that the accelerometer is not able to distinguish sufficiently quickly between impacts of different degrees of severity. The accelerometer can only respond to the deceleration of the central part of the motor vehicle which is separated from the point of impact by a "crumple zone". Thus the deceleration experienced by the central part of the vehicle or its integrated valve may be substantially the same at the time when the safety device has to be triggered, regardless of the degree of severity of the impact.

Whilst an accelerometer provided at the front of the vehicle would be able to distinguish between impacts of different severity sufficiently quickly, there would be a grave risk that a front-mounted accelerometer would be substantially damaged during an impact and thus would not prove to be reliable.

SUMMARY OF THE INVENTION

The present invention seeks to provide an improved safety arrangement.

According to the present invention there is provided a safety arrangement in a motor vehicle, the safety arrangement comprising a processor, a central accelerometer adapted to provide an input signal to the processor indicative of the acceleration being experienced by a central part of the vehicle, at least one front sensor mounted adjacent the front of the vehicle adapted to provide an input signal to the processor in response to an impact at the front of the vehicle, the front sensor being able to distinguish between differing degrees of severity of the impact, the processor being adapted to control at least one safety device, which safety device has different modes of performance, the processor being adapted to activate the safety device in response to a predetermined signal generated by the central accelerometer, the processor also being adapted to select or control the mode of performance of the safety device in dependence upon the signal from the front sensor.

In the preferred arrangement the processor will be adapted to select or control the mode of performance of the safety device in a predetermined manner in the absence of a signal from the front sensor—for example, if the front sensor is totally destroyed during the first instant of an impact. Thus whenever the central accelerometer generates the predetermined signal the safety device is activated and the mode of operation will be the predetermined mode unless a signal from the front sensor causes the processor to select a different mode.

Preferably the safety device comprises an air bag.

Conveniently the processor is adapted to select or control the time of inflation of the air bag and the degree of inflation of the air bag.

Advantageously the air bag is provided with a plurality of gas generators, the processor being adapted to select or control which gas generator is activated and the time of activation of the gas generator.

Preferably the air bag is provided with a venting valve, the venting valve being controlled by the processor.

Conveniently the venting valve is an adjustable venting valve.

Preferably the front sensor is responsive to displacement of the front bumper or part of the vehicle at the front of the vehicle relative to the chassis or monocoque shell of the vehicle.

Advantageously the front sensor comprises an accelerometer responsive to acceleration of a front part of the vehicle.

Preferably the front sensor provides two or more signals each representative of a discrete level of severity of impact.

Conveniently the processor is adapted to measure the time delay between the different signals representative of discrete levels of severity of impact.

Preferably the front sensor provides a continuous output signal, the processor being adapted to sample that signal with a predetermined sampling frequency.

Conveniently the sampling frequency is equal to or greater than 100 Hz.

Advantageously the safety device is activated only when there is a predetermined signal from the central accelerometer.

Conveniently the predetermined threshold is a variable threshold, and is determined in response to a signal from the front sensor.

Preferably the processor calculates the difference between an integrated signal from the front accelerometer and an integrated signal from the central accelerometer to determine the mode of activation of the safety device.

Convenient triggering of the safety device is activated whenever the mean value of an integrated signal from the central accelerometer or the front sensor exceeds a predetermined threshold.

The arrangement may comprise two front sensors, one located at each side of the vehicle.

Preferably the mode of operation of the safety device is determined at least partially in response to the difference between the signals from the two front sensors.

The processor may additionally be adapted to select or control the mode of performance of the safety device in dependance upon one or more signals from one or more further sensors in the motor vehicle. Such a further sensor may comprise a seat sensor to sense the presence of an occupant upon a seat in the vehicle.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figure 1:
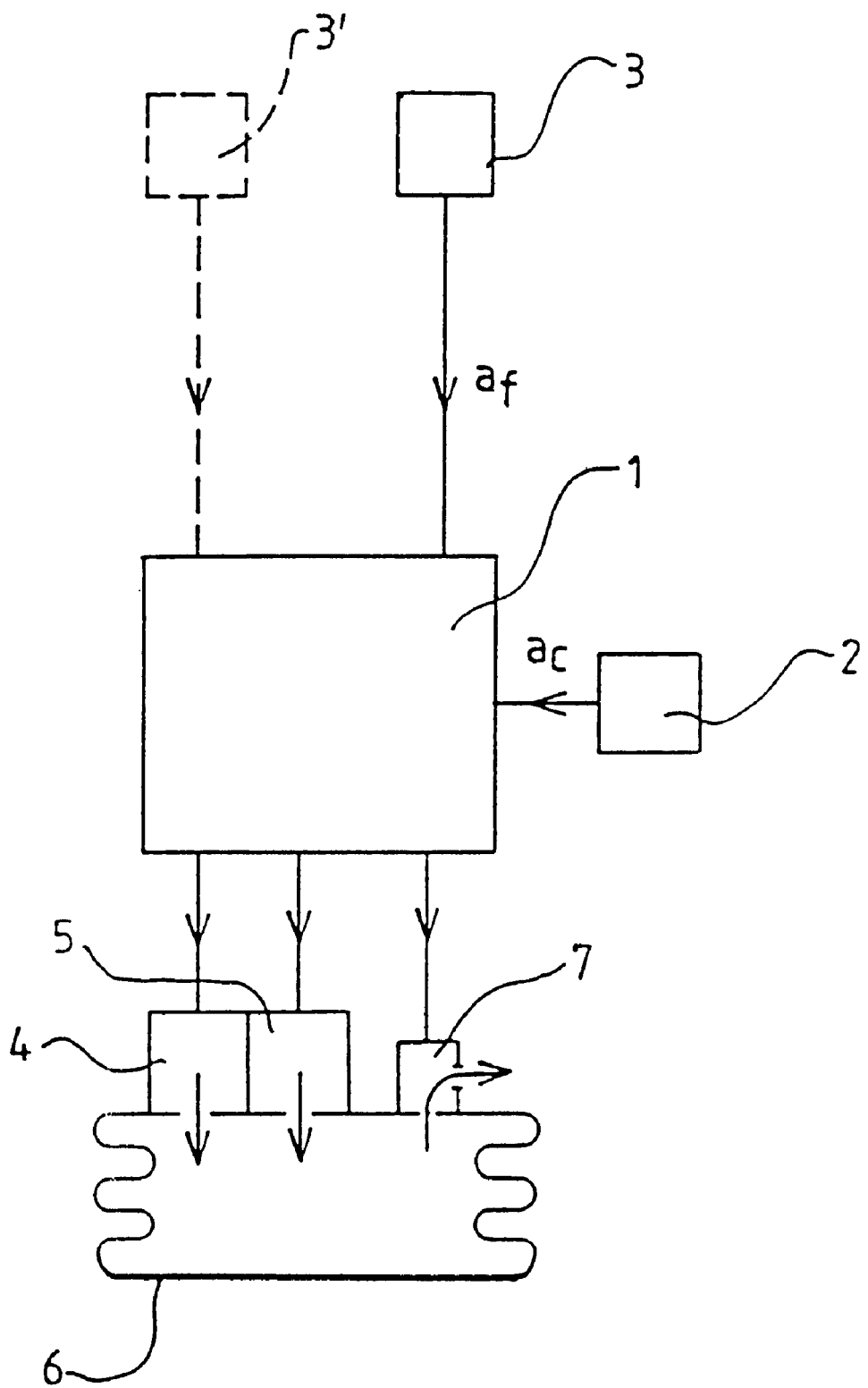
FIG. 1 is a block diagram illustrating one embodiment of a safety arrangement in accordance with the invention.

Referring to the drawing, a safety arrangement to be included in a motor vehicle comprises a processor 1. The processor 1 is, as will be described, associated with a plurality of sensors which provide the processor with data. The processor assesses the data provided by the sensors and determines when an accident situation exists.

The processor also determines the degree of severity of the accident, and then initiates the activation of a safety device, such as the inflation of an air bag, in a controlled manner, so that the safety device responds appropriately to the degree of severity of the accident.

As can be seen from the accompanying drawing the processor 1 is connected to receive a signal from a central accelerometer 2. The central accelerometer 2 may be of any appropriate design but is connected to the chassis or monocoque shell of a motor vehicle at a substantially central position. Thus the central accelerometer 2 is adapted to sense the acceleration of the passenger compartment of a motor vehicle.

The processor 1 is also connected to receive signals from a second sensor 3 which is located at the front of the vehicle and comprises an impact sensor, such as an accelerometer responsive to the acceleration of the front part of the vehicle. The impact sensor 3 is adapted to provide a signal to the processor 1, that signal being indicative of the degree of severity of the impact.

In a simple embodiment of the invention the impact sensor 3 may comprise an arrangement consisting of two accelerometers each adapted to provide an output signal when a predetermined acceleration is sensed. The accelerometers would be such that a first accelerometer would respond to a relatively low acceleration, whereas the other accelerometer would respond to a relatively high acceleration. The accelerometers would be connected to a portion of the motor vehicle located at the front of the motor vehicle, such as, for example, the front bumper. In the event that an accident occurs involving a front impact, if the impact is a very low speed impact neither of the accelerometers would be activated. If the impact is a moderate speed impact one of the accelerometers will be activated, whereas if the impact is a high speed impact, both of the accelerometers will be activated.

It will thus be appreciated that the processor will receive a signal from the sensor 3 which is indicative of the degree of severity of the impact. The signal received by the processor will comprise either the signal from the first accelerometer, indicating a low speed impact, or the signal from the first accelerometer followed by a signal from the second accelerometer, indicating a high speed impact. The time period between the commencement of the first signal and the commencement of the second signal may be measured and may also indicate the degree of severity of the impact.

Thus the front sensor may be such as to provide discrete output signals, the successive signals being sent from the sensor to the processor as soon as successive predetermined threshold levels have been reached. The processor may, in such an arrangement, measure the time taken for each successive threshold to be reached.

It is to be appreciated that the arrangement described above is very simple, and it is preferable that a more sophisticated arrangement is utilized. Thus, the front sensor 3 may comprise an accelerometer which provides a substantially continuous output signal indicative of the instantaneous acceleration of the front of the vehicle. The substantially continuous signal may be monitored by the processor 1 using a predetermined sampling frequency. The sampling frequency may preferably be greater than 100 Hz, meaning that the signal from the front accelerometer is sampled every 10 ms.

The signal from the front accelerometer may be integrated with respect to time and also the signal from the central accelerometer 2 may be integrated with respect to time. The processor thus calculates the change in velocity sensed by the front accelerometer and also the change in velocity determined by the central accelerometer over a period of time.

The change in velocity measured by the central accelerometer during the initial stages of a crash is not really dependent upon the speed of the crash. Thus, for example, for a crash into an immovable object when the vehicle is travelling initially at 16 meters per second and also in an equivalent situation when the vehicle is travelling at 10 meters per second, the change in velocity measured by the central accelerometer approximately 20 ms after the impact commences will be about 4 meters per second. Thus, although the speed of the vehicle before impact is very different in the two different situations exemplified above, at approximately 20 ms after the impact commences, the central accelerometer will provide virtually identical signals when the output of the accelerometer has been integrated with respect to time. It is only after approximately 120–140 ms that the integrated output is really representative of the initial speed of the vehicle.

In contrast the front sensor 3 which is responsive to the displacement or deformation of the bumper or front of the vehicle relative to the central part of the chassis or monocoque shell provides an immediate (although approximate) indication of the initial speed of the vehicle or the speed of the impact.

In a modified embodiment of the invention the processor 1 is associated with a second front sensor 3', the front sensor 3 and 3' being located one at each side of the motor vehicle.

The processor 1 processes information supplied to it by the sensors 2, 3 (and 3'). The sensor is connected, in the illustrated embodiment, to a first gas generator 4 and a second gas generator 5, each associated with a single air bag 6. The processor is also connected to a controlled vent 7 for the air bag.

The processor activates the air bag 6 by initiating the gas generator 4 or the gas generator 5. The gas generators are each adapted to generate a different volume of gas. The processor also controls the adjustable vent 7.

It is to be appreciated, therefore, that the processor can control not only the time of inflation of the air bag 6, but also the degree to which the air bag is inflated, there being three degrees of inflation caused by activation of solely the gas generator 4, solely the gas generator 5 or both the gas generator 4 together with the gas generator 5. The speed of inflation and the subsequent deflation can be adjusted by controlling the adjustable vent 7, and also by selecting the time of activation of each gas generator.

It is to be appreciated that many other arrangements can be adopted for controlling the degree of inflation of the air bag. For example, there may be an inner air bag located within an outer air bag. Appropriate gas generators may be provided to inflate either the small bag or the big bag or both bags.

The air bag is activated when the integrated signal from the central accelerometer reaches a certain threshold. The threshold may be an adjustable threshold, adjusted in accordance with a signal received from the front sensor 3.

The processor may evaluate the severity of the crash in various ways. A preliminary indication of the severity of the crash may be determined from the signals received from the front sensor 3. However, the processor may calculate the difference between an integrated signal from the front accelerometer 3 and an integrated signal from the central accelerometer 2 thus determining a value which is closely related to the degree of deformation of the front part of the vehicle. The triggering may also be effected when the mean value of the acceleration measured by the central accelerometer 2 and/or the front accelerometer 3 exceed a predetermined threshold. The mean value of acceleration may be generated by dividing the integrated acceleration signal by time.

Where two sensors 3, 3' are provided the performance of the safety system may be dependent upon the difference between the signals from the two front sensors.

Preferably the processor is such that if no appropriate signal is received from the front sensor, nevertheless the air bag will be inflated on receipt of a signal from the central accelerometer 2 which exceeds a predetermined threshold.

It is to be appreciated that in a low speed crash the air bag would be inflated at an appropriate time, determined by the processor, but the bag would only be partially inflated so as to provide a soft cushion. In an accident involving higher speeds and more rapid deceleration the air bag would be inflated, again at an appropriate time determined by the processor, to be "harder".

Figure 2:
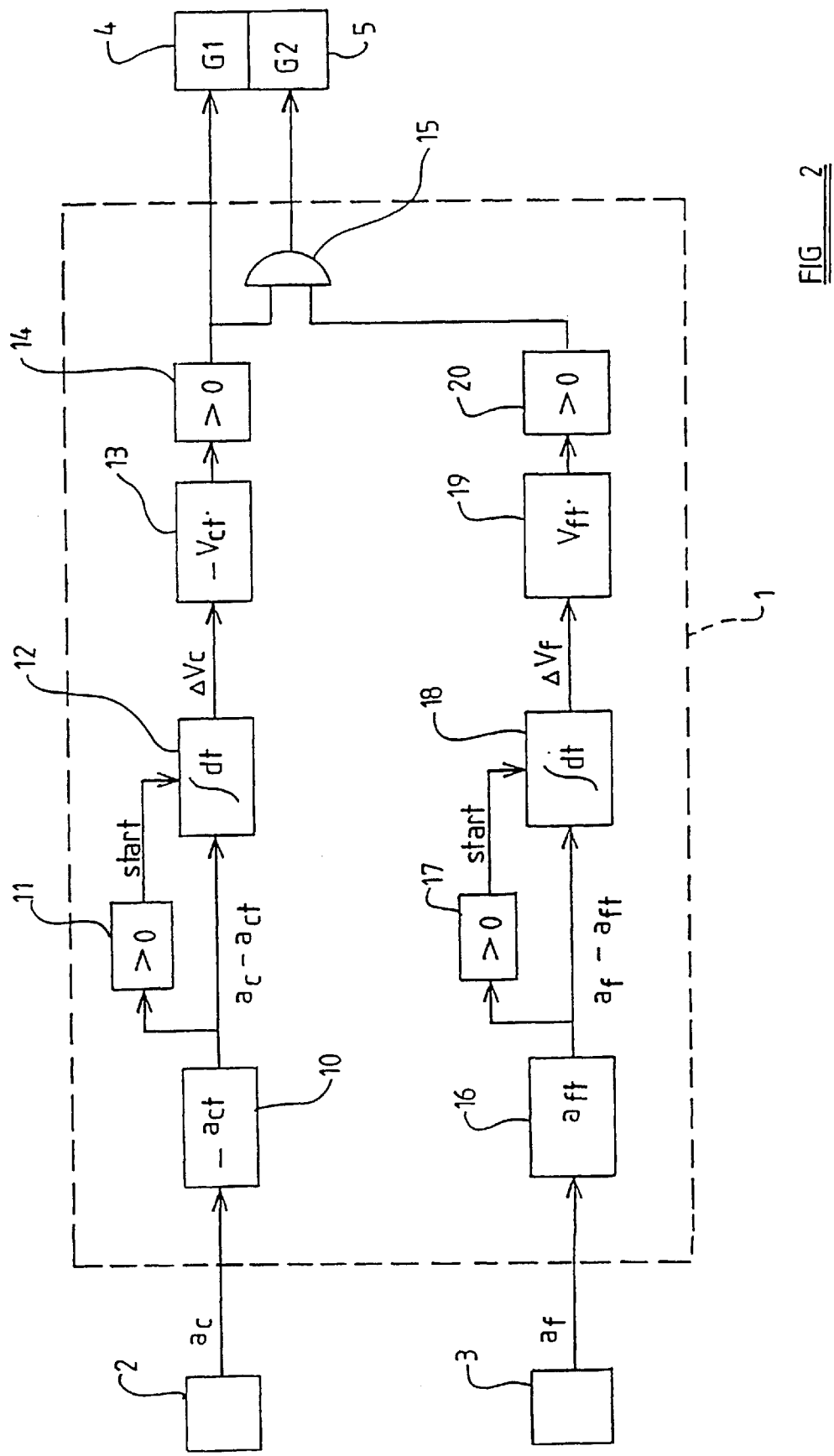
FIG. 2 is a block diagram of a second embodiment of a safety arrangement in accordance with the invention.

Referring now to FIG. 2, a second embodiment of the invention is illustrated. The illustrated embodiment includes a processor 1 adapted to receive signals from a central accelerometer 2 and also connected to receive signals from a second sensor 3 which is located at the front of the vehicle and which comprises an accelerometer of the type that supplies a continuous output signal representative of the instantaneous acceleration sensed by the accelerometer.

The processor 1 is connected to control two gas generators 4,5 associated with an air-bag.

The signal $a_c$ from the central accelerometer 2 is passed to a subtracter 10 where a threshold value act is subtracted. If the output of the subtracter is greater than zero, as determined by a comparator 11, the signal from the central accelerometer has exceeded a predetermined threshold, and the comparator 11 commences operation of an integrator 12 which integrates the difference signal with a respect to time. Thus the integrator 13 integrates the value of $a_c - a_{ct}$ with respect to time. This integrated value represents a change in velocity which can be identified as $\Delta V_c$. This value is passed to a further subtration circuit 13 where a threshold value $V_{ct}$ is subtracted. The output of the subtraction circuit is passed to a comparator 14 which determines if the value is greater than zero. If the value is greater than zero an output is provided on the output of the comparator 14, that output being passed to the ignition circuit of a first gas generator 4 and also being passed to one input of an AND Gate 15.

The front accelerometer 3 produces a signal $a_f$ representative of the acceleration sensed by the front accelerometer. This signal is passed to a subtracting circuit 16 where a threshold value $a_{ft}$ is subtracted from the measured value. The output of the subtracting circuit 16 is passed to a discriminator 17 which determines if the output of the subtracting circuit is greater than zero. If the output is greater than zero, an integrator 18 is activated which integrates the difference signal with a respect to time. Thus the signal $a_f - a_{ft}$ is integrated with regard to time which gives a signal representative of the change of velocity of the front part of the vehicle represented by $\Delta V_f$.

This signal is passed to a subtraction circuit 19 where a threshold value $V_{ft}$ is subtracted from the measured value and the output of the subtracting circuit is passed to a discriminator 20 which determines whether the output of the subtraction circuit 19 is greater than zero. If the output of the subtraction circuit 19 is greater than zero, the discriminator 20 provides an output which is supplied to the second input of the AND Gate 15. When the AND Gate 15 receives input signals on both of its inputs it generates an output which is supplied to the triggering circuit of a second gas generator 5.

It will thus be appreciated that whenever the signal $a_c$ exceeds a predetermined threshold, and when the integral of the signal over a period of time also exceeds a predetermined threshold, the first gas generator 4 will be activated. However, if the signal $a_f$ exceeds a threshold and if the integral of the signal with respect to time exceeds a further predetermined threshold, then the gas generator 5 will also be activated.

Whilst, in the arrangement illustrated in FIG. 2, a signal is passed to a subtracting circuit where a threshold value is subtracted and the result is then passed to a comparator which determines if the resultant signal is greater than zero, it would, alternatively, be possible simply to compare the signal with the threshold value in an appropriate comparator.

I claim:

1. A safety arrangement in a motor vehicle comprising:
    a processor;
    a central accelerometer for providing an input signal to the processor indicative of the acceleration being experienced by a central part of the vehicle;
    at least one front sensor mounted adjacent the front of the vehicle for providing an input signal to the processor in response to an impact at the front of the vehicle, said front sensor being able to distinguish between differing degrees of severity of the impact; and
    a safety device having different modes of performance which is controlled by said processor, said processor activating said safety device in response to a predetermined signal generated by the central accelerometer and selecting or controlling the mode of performance of the safety device in dependence upon the signal from the front sensor.

2. A safety device arrangement according to claim 1, wherein the safety device comprises an air bag.

3. A safety arrangement according to claim 2, wherein the processor selects or controls the time of inflation of the air bag and the degree of inflation of the air bag.

4. An arrangement according to claim 3, wherein the air bag is provided with a plurality of gas generators, the processor selecting or controlling which gas generator is activated and the time of activation of the gas generator.

5. An arrangement according to claim 2, wherein the air bag is provided with a venting valve, operation of the venting valve being controlled by the processor.

6. An arrangement according to claim 5, wherein the venting valve is an adjustable venting valve.

7. An arrangement according to claim 1, wherein the front sensor is responsive to displacement of a front bumper or a part of the vehicle at the front of the vehicle relative to the chassis or monocoque shell of the vehicle.

8. An arrangement according to claim 1, wherein the front sensor comprises an accelerometer responsive to acceleration of a front part of the vehicle.

9. An arrangement according to claim 1, wherein the front sensor provides two or more signals, each representative of a discrete level of severity of impact.

10. An arrangement according to claim 9, wherein the processor measures the time delay between the said different signals representative of discrete levels of severity of impact.

11. An arrangement according to claim 1, wherein the front sensor provides a continuous output signal, the processor sampling that signal with a predetermined sampling frequency.

12. An arrangement according to claim 11, wherein the sampling frequency is equal to or greater than 100 Hz.

13. An arrangement according to claim 1, wherein the safety device is activated when the integrated output signal of the central accelerometer reaches a predetermined threshold.

14. An arrangement according to claim 13, wherein the predetermined threshold is a variable threshold, and is determined in response to a signal from the front sensor.

15. An arrangement according to claim 1, wherein the at least one sensor includes a front accelerometer, and the processor calculates the difference between an integrated signal from the front accelerometer and an integrated signal from the central accelerometer to determine the mode of activation of the safety device.

16. An arrangement according to claim 1, wherein triggering of the safety device is activated whenever the mean value of an integrated signal from the central accelerometer or the front sensor exceeds a predetermined threshold.

17. An arrangement according to claim 1, comprising two front sensors, one located at each side of the vehicle.

18. An arrangement according to claim 17, wherein the mode of operation of the safety device is determined at least partially in response to the difference between the signals from the two front sensors.

19. A safety arrangement according to claim 1 wherein the processor is additionally selects or controls the mode of performance of the safety device in dependence upon one or more signals from one or more further sensors in the motor vehicle.

* * * * *